(12) United States Patent
Inn

(10) Patent No.: US 6,853,174 B1
(45) Date of Patent: Feb. 8, 2005

(54) SELECTIVE HIGH-SIDE AND LOW-SIDE CURRENT SENSING IN SWITCHING POWER SUPPLIES

(75) Inventor: Bruce L. Inn, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 10 days.

(21) Appl. No.: 10/639,066

(22) Filed: Aug. 11, 2003

(51) Int. Cl.[7] .................................................. G05F 1/44
(52) U.S. Cl. ...................................... 323/285; 323/284
(58) Field of Search ................................. 323/284, 285, 323/282, 225, 224

(56) References Cited

U.S. PATENT DOCUMENTS 6,166,528 A  * 12/2000 Rossetti et al. ............. 323/283

* cited by examiner

Primary Examiner—Shawn Riley
(74) Attorney, Agent, or Firm—Patent Law Group LLP; Carmen C. Cook

(57) ABSTRACT

A current mode switching regulator implementing a dual sense scheme includes a first current sensing circuit for sensing a current through a first switch and providing a first current sense signal, and a second current sensing circuit for sensing a current through a second switch and providing a second current sense signal. The switching regulator includes a control circuit for generating switch control signals for driving the first and second switches in response to one of the first and second current sense signals. The regulator further includes a duty cycle detection circuit coupled to determine a duty cycle of the switching regulator. The detection circuit asserts a first select signal to select the first current sense signal when the duty cycle exceeds a first threshold level and asserts a second select signal to select the second current sense signal when the duty cycle is less than a second threshold level.

36 Claims, 7 Drawing Sheets

SELECTIVE HIGH-SIDE AND LOW-SIDE CURRENT SENSING IN SWITCHING POWER SUPPLIES

FIELD OF THE INVENTION

The invention relates to switching power supplies or switching regulators and, in particular, to a switching regulator employing selective current sensing to assert either peak or valley control.

DESCRIPTION OF THE RELATED ART

A switching regulator, also referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within certain load limits of the circuit.

A common technique used in the feedback control is pulse-width modulation (PWM). That is, the output voltage $V_{OUT}$ of the switching regulator is regulated by controlling the duty cycle (or by varying the pulse width) of the rectangular switch voltage $V_{SW}$ applied to the inductor and the capacitor of the output filter circuit. FIG. 1 is a circuit diagram of a conventional switching regulator configured in a buck or step-down topology. In the PWM switching regulator 10 of FIG. 1, a high-side switch $M_{HS}$ drives the switch voltage $V_{SW}$ to the input voltage $V_{IN}$ while a low-side switch $M_{LS}$ drives the switch voltage $V_{SW}$ to the ground potential. The high-side switch and the low-side switch are sometimes referred to as power switches or output switching device of the switching regulator. The switch voltage $V_{SW}$ is coupled to an output filter circuit including an inductor and a capacitor connected in series between the switch voltage output node and the ground node. The output voltage $V_{OUT}$ is generated at a node between the inductor and the capacitor. In a buck regulator, the output voltage $V_{OUT}$ is a voltage stepped down from the input voltage $V_{IN}$.

In switching regulator 10, the feedback control circuit includes an error amplifier for sensing the difference between a reference voltage $V_{Ref}$ and the output voltage $V_{OUT}$ of the switching regulator. The detected voltage difference is coupled to a pulse width modulator (PWM) circuit 12. A system clock provides the master clock to the PWM circuit. In response to the error voltage generated by the error amplifier, PWM circuit 12 generates a Gate_Drive control signal to cause either the high-side switch or the low-side switch to turn on, regulating the switch voltage $V_{SW}$. For instance, the Gate_Drive control signal can be a rectangular waveform whose duty cycle is proportional to the error voltage. In the exemplary circuit shown in FIG. 1, the Gate_Drive control signal is coupled to a driver circuit 14 for driving the switch transistors $M_{HS}$ and $M_{LS}$. In the present illustration, high-side switch $M_{HS}$ and low-side switch $M_{LS}$ are of the same polarity (both NMOS transistors). Therefore, driver circuit 14 drives high-side switch $M_{HS}$ with a non-inverted waveform and drives low-side switch $M_{LS}$ with an inverted waveform.

A PWM switching regulator provides regulation by controlling the duty cycle of the rectangular switch voltage $V_{SW}$ that is applied to the inductor and the capacitor of the output filter circuit. In the present description, "duty cycle" is defined as the percentage of time a switching device is turned on to cause the inductor current to increase. In general, if the load voltage $V_{OUT}$ is too low, the feedback control system increases the duty cycle so as to increase the amount of energy provided to the inductor. If the load voltage is too high, the feedback control system decreases the duty cycle so as to decrease the amount of energy provided to the inductor.

Control of the duty cycle in a PWM switching regulator can be accomplished using a current mode control or a voltage mode control. Current mode and voltage mode switching regulators are well known in the art. FIG. 2A is a circuit diagram illustrating a conventional current mode switching regulator and FIG. 2B illustrates an exemplary inductor current waveform illustrating the operation of the current mode control in the switching regulator of FIG. 2A. FIG. 3A is a circuit diagram illustrating a conventional voltage mode switching regulator and FIG. 3B illustrates an exemplary inductor voltage waveform illustrating the operation of the voltage mode control in the switching regulator of FIG. 3A.

In a current mode control switching regulator (FIG. 2A), the duty cycle is set by comparing the current in the power stage of the switching regulator to a level set by a voltage control loop. Specifically, the output voltage $V_{OUT}$ is fed back through a voltage divider to one input of a difference amplifier or an error amplifier). The other input is connected to a voltage reference $V_{Ref}$. The difference amplifier provides an error voltage for driving a PWM comparator, establishing the voltage control loop. The output current of the switching regulator is sensed and the sensed current signal is compared against the error voltage at the PWM comparator, establishing the current control loop.

In FIG. 2A, the current flowing through the high-side switch $M_{HS}$ is sensed by means of a resistance, depicted as $R_{sense}$. The voltage across the resistance is compared by PWM comparator to the error voltage generated by the difference amplifier. The PWM comparator generates the Gate_Drive control signal to control the power switches. In operation, the upper switch is turned on long enough so that the current in the inductor ramps up to the threshold set by the error voltage (see FIG. 2B).

In a voltage mode control switching regulator (FIG. 3A), the duty cycle is set by comparing an error voltage to a ramp signal at a PWM comparator. Specifically, the output voltage $V_{OUT}$ is fed back through a voltage divider to one input of a comparator. The comparator receives a voltage reference $V_{Ref}$ as the other input and generates an error voltage indicative of the difference between the output voltage $V_{OUT}$ and the reference voltage $V_{Ref}$. The error voltage is coupled to a PWM comparator. The PWM comparator receives the error voltage and a ramp signal as input where the error voltage sets the threshold of the PWM comparator. The output of the PWM comparator is the Gate_Drive control signal for driving the power switches. In operation, the greater the error voltage, the higher the comparator threshold on the PWM comparator and the longer the upper power switch is held on (hence, longer duty cycle) to provide energy to the output filter circuit (see FIG. 3B). Thus, the error voltage sets the duty cycle of the voltage $V_{SW}$ driving the inductor L of the filter circuit. The inductor and the capacitor function as a two-pole filter establishing output voltage $V_{out}$ at the average value of the voltage presented to the inductor.

Typically, current mode control is the higher performance control choice for switching mode power supplies. In comparison to voltage mode control, the current mode control method has the advantages of simplifying the stabilization of the system and enabling better dynamic performance. The superiority of the current mode control method results from the fact that current mode control eliminates the complex conjugate pole that the inductor and capacitor naturally create which plagues voltage mode control systems.

In current mode control (FIG. 2A), duty cycle control is provided by sensing the current through the energy storage element (such as the inductor) or through one of the output power switches (that is, current sensing is performed either at the high side switch or the low side switch). In essence, current sensing is performed to control either the peak or the valley of the duty cycle. Current sensing can be carried out by placing a resistor in series with the switches or by using the inherent resistance of the switching device, that is, measuring the voltage across the device. Current sensing can also use a ratioed switching device placed in parallel to the power switch to be sensed to draw a fraction of the current away for measurement. The conventional current sensing methodology will be referred to as a single-sensing scheme.

A difficulty in the use of the conventional single-sensing scheme arises when the operating point of the switching regulator causes the current-sensing window to be very brief. Depending on the duty cycle of the switching regulator, the current being sensed may flow for only a very short time per cycle, leaving a very short time interval for sensing. The short sensing interval can occur when the system clock frequency is high and/or the duty cycle is at a value close to the extreme (i.e., either 0 or 100 percent) such that the sense current only flows for a small percentage of the cycle time. Under such conditions, the PWM comparator must operate at an extremely fast rate. Not only is providing a fast PWM comparator a difficult objective, but such a comparator is typically noise sensitive and therefore not desirable.

One scenario in which the duty cycle of a switching regulator will go to the extreme is when the output voltage to input voltage ratio is steep. In the step-down topology such as that shown in FIG. 2A, the duty cycle D is given by the ratio of the output voltage to input voltage:

$$D=V_{OUT}/V_{IN}.$$

If the current is sensed in the high-side switch $M_{HS}$, then the PWM comparator will have a very short sensing window when the $V_{OUT}$ voltage is a lot smaller than $V_{IN}$ and the duty cycle is accordingly very low. This operation regime is an increasingly commonly-occurring case as technology trends are causing system supply voltages (corresponding to $V_{OUT}$) to decrease relative to the input voltage $V_{IN}$. Consequently, there are increasing numbers of situations in which the duty cycle of a step down switching power supplies will approach zero, making high-side current sensing difficult.

In some applications, the high-side sensing problem is solved by sensing current at the low-side switch $M_{LS}$. Then, when the duty cycle is low, the PWM comparator actually has more time to sense as the sensing is done at the low-side switch which is turned on longer when the duty cycle is low. However, using low-side sensing results in the same sort of problem at the opposite extreme in duty cycle where the duty cycle is very high. When the duty cycle is very high, the low-side switch is on for only a very short portion of the cycle. A high duty cycle situation typically occurs in battery-powered applications where, as the battery voltage (corresponding to $V_{IN}$) declines due to usage over time, the duty cycle of the switching regulator will go to nearly 100 percent in order to generate the desired $V_{OUT}$. In the high duty cycle condition, sensing at the low-side switch becomes difficult.

In sum, a growing number of applications require a power supply to operate at duty cycles that go from nearly 100 percent to 0 percent. Therefore, no matter whether such supplies sense current through the high-side or low-side switch, the power supplies must operate in a regime where duty cycle control is difficult due to short sensing window.

Further, within the sensing window, the initial portion of the sensed signal typically must be masked off to avoid sensing distortion caused by spurious transient currents. Hence, the window of time in which the sensing and comparison must occur is in fact even narrower than the theoretical value.

Conventional techniques for addressing the sensing difficulty in a short sense window situation have not been satisfactory. In some applications, a very fast PWM comparator is used. However, a fast PWM comparator is difficult to design and becomes very noise sensitive when the sense window is in the nanosecond time regime. In other cases, current sensing can be selected at the switches with the typically longer sense window. However, as discussed above, today's switching regulators may need to operate between 0 to 100 percent duty cycle, making this solution impractical. Another solution involves skipping measurement cycles so that the average duty cycle is small enough but the duty cycle when current actually flows is large enough for accurate sensing. However, skipping measurement cycles increases the ripple in the output current and generates noise that are not at the system clock frequency, rendering the noise difficult to filter out.

Lastly, some applications perform current sensing at the inductor. Although the inductor current is always present for sensing, the phase of interest may still be of short duration. For example, if the control architecture senses at the rising phase of the current and the duty cycle is close to zero for this phase, sensing is still difficult because of a narrow sense window. Furthermore, current sensing at the inductor typically involves higher power dissipation due to the use of a resistor in series with the inductor.

Therefore, it is desirable to provide a current mode switching regulator where current sensing can be effectively performed to implement current mode control.

SUMMARY OF THE INVENTION

According to one embodiment of the present invention, a current mode switching regulator includes a first switch and a second switch coupled to drive a switch output node for generating a switch output voltage which switch output voltage is used to generate a regulated output voltage having a substantially constant magnitude.

To implement the current sensing scheme of the present invention, the switching regulator further includes a first current sensing circuit for sensing a current through the first switch and providing a first current sense signal, and a second current sensing circuit for sensing a current through the second switch and providing a second current sense signal. The switching regulator also includes a control circuit for generating a first switch control signal and a second switch control signal for driving the first switch and the second switch respectively for generating the switch output voltage so as to maintain the regulated output voltage at a substantially constant magnitude. The control circuit generates the switch control signals in response to a selected one of the first and second current sense signals.

Finally, the switching regulator includes a duty cycle detection circuit coupled to determine a duty cycle of the switching regulator. The duty cycle detection circuit asserts a first select signal when the duty cycle exceeds a first threshold level and asserts a second select signal when the duty cycle is less than a second threshold level, the first threshold level being greater than the second threshold level. In operation, the control circuit selects the first current sense signal when the first select signal is asserted and the control circuit selects the second current sense signal when the second select signal is asserted.

In another embodiment, the switching regulator further includes an output filter circuit coupled to the switch output node for receiving the switch output voltage and generating the regulated output voltage. The first switch is turned on to cause a current into the output filter circuit to increase while the second switch is turned on to cause the current into the output filter circuit to decrease. In one embodiment, the duty cycle is indicative of the amount of time within a clock period the first switch is turned on.

According to another embodiment of the present invention, the duty cycle detection circuit determines the duty cycle of the switching regulator by monitoring the first switch control signal.

The present invention is better understood upon consideration of the detailed description below and the accompanying drawings.

DETAILED DESCRIPTION OF THE PREFERRED EMBODIMENTS

In accordance with the principles of the present invention, a current mode switching regulator employs selective current sensing whereby high-side current sensing and low-side current sensing are both provided and depending on the prevailing duty cycle, the current sense signal with the longer sense window is selected. The selection of the current sense signal in turn enables the switching regulator to assert peak or valley control of the duty cycle. In this manner, effective current mode control is realized as an adequate sensing window is always ensured despite changing operation conditions. In one embodiment, a switching regulator performs current sensing at the energy storage element (such as an inductor) and the current sense signal for the increasing or the decreasing current phase is selected based on the duty cycle to assert peak or valley control of the duty cycle.

Figure 1:
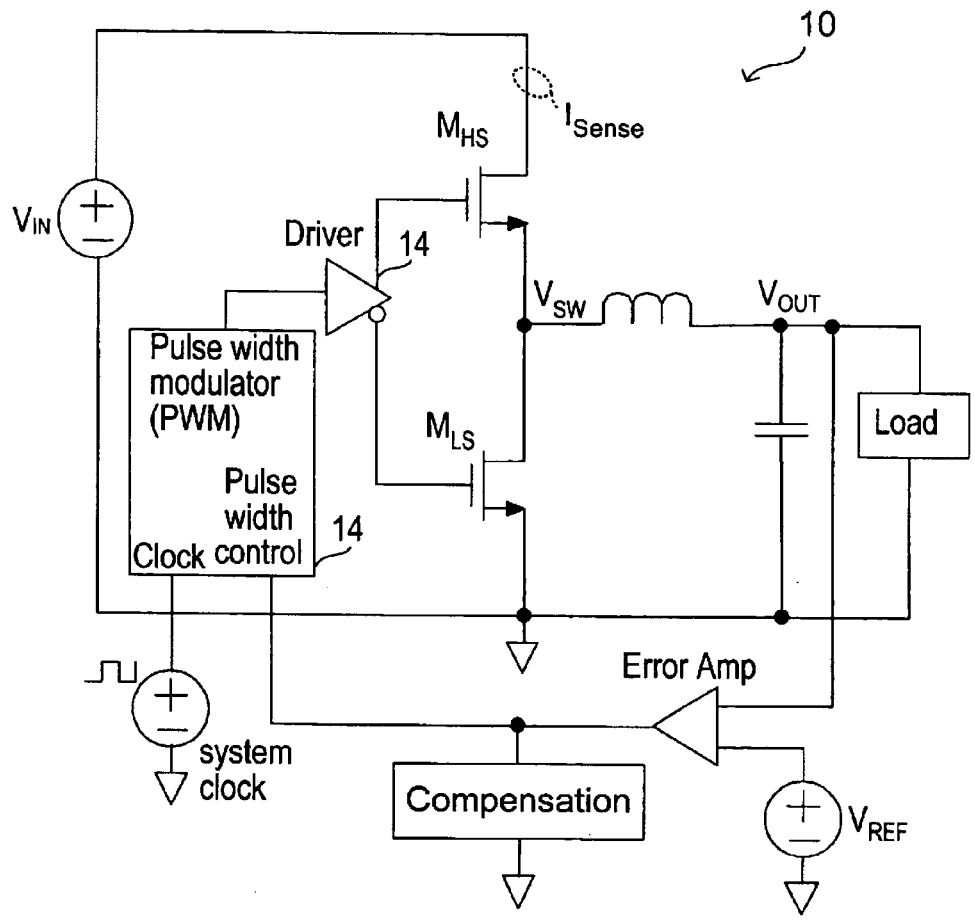
FIG. 1 is a circuit diagram of a conventional switching regulator configured in a buck or step-down topology.
Figure 2A:
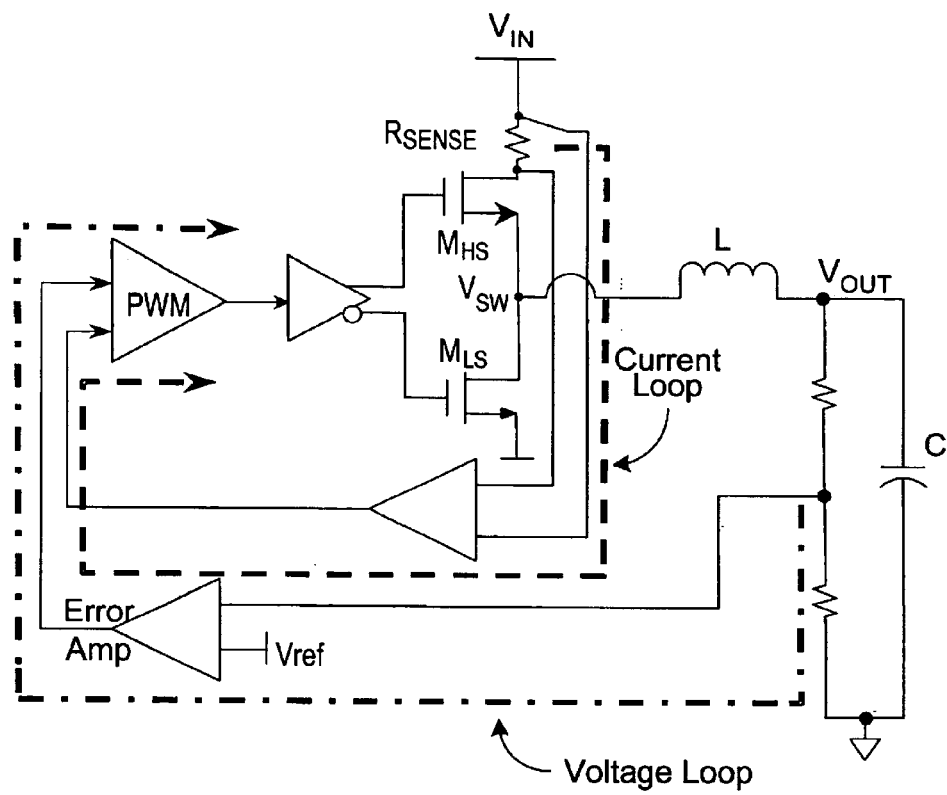
FIG. 2A is a circuit diagram illustrating a conventional current mode switching regulator.
Figure 2B:
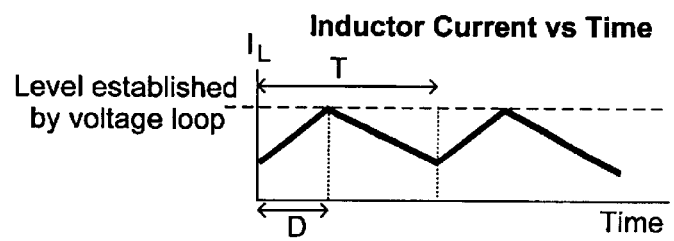
FIG. 2B illustrates an exemplary inductor current waveform illustrating the operation of the current mode control in the switching regulator of FIG. 2A.
Figure 3A:
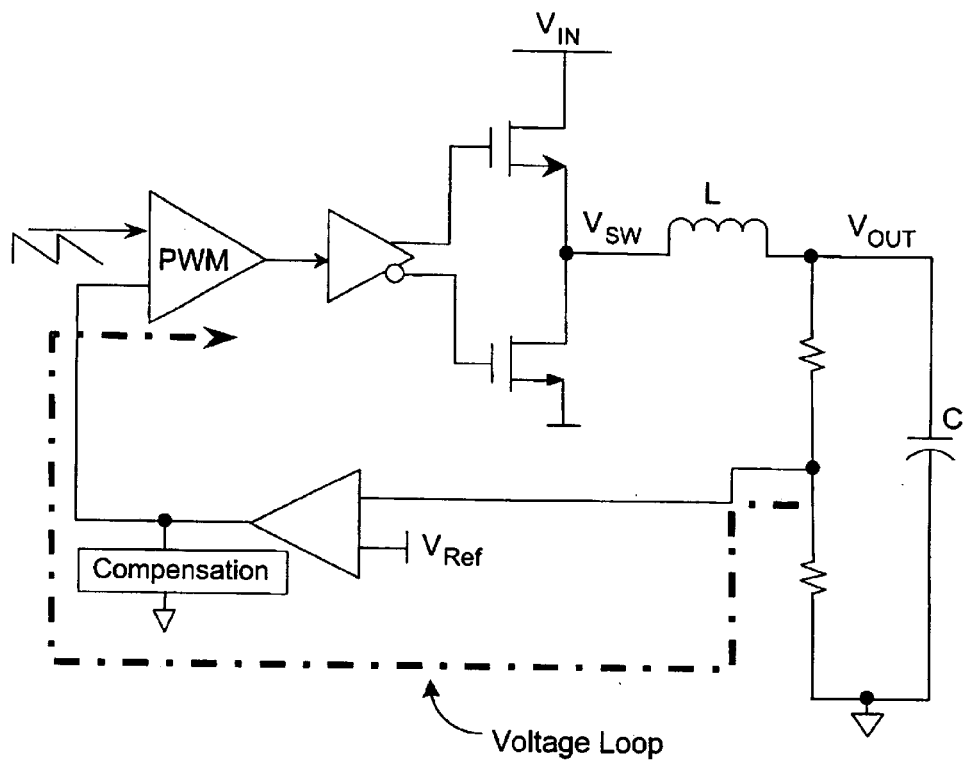
FIG. 3A is a circuit diagram illustrating a conventional voltage mode switching regulator.
Figure 3B:
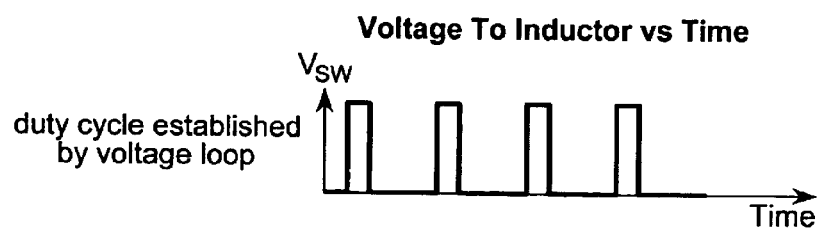
FIG. 3B illustrates an exemplary inductor voltage waveform illustrating the operation of the voltage mode control in the switching regulator of FIG. 3A.

In the present description, "duty cycle" is defined as the percentage of time within a system clock period a switching device is turned on to cause the inductor current to increase. Thus, referring to FIG. 2B, the duty cycle of the switching regulator is the percentage of time "D" that the inductor current is increasing within the system clock period "T". In typical switching regulator topologies, the duty cycle refers to the amount of time the high-side switch is turned on. When the low-side switch is turned on, the inductor current is caused to decrease. Furthermore, in the present description, the terms "peak control" and "valley control" have their well-known meaning in the art for controlling the duty cycle of a current mode control switching regulator. When peak control is employed, the switching regulator controls when the high-side switch should be turned off to stop the increase of inductor current. Hence, the control is applied to the "peak" of the inductor current waveform. When valley control is employed, the switching regulator controls when the low-side switch should be turned off to stop the decrease of inductor current. Hence, the control is applied to the "valley" of the inductor current waveform.

Figure 4:
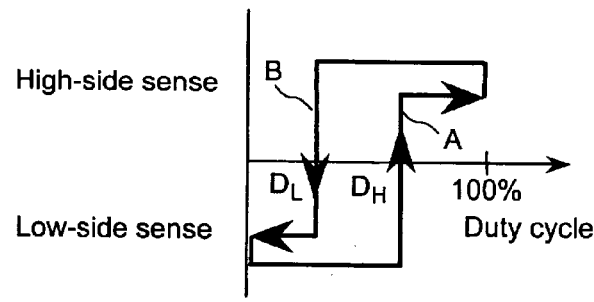
FIG. 4 is a diagram illustrating the current sensing scheme according to one embodiment of the present invention.

FIG. 4 is a diagram illustrating the current sensing scheme according to one embodiment of the present invention. In accordance with the present invention, sensing of the current associated with the high-side switch (the high-side current) and the current associated with the low-side switch (the low-side current) is provided. When the duty cycle is high, high-side sensing mode is selected where the high-side current is sensed (see curve portion A in FIG. 4). When the duty cycle is low, the low-side sensing mode is selected where the low-side current is sensed (see curve portion B in FIG. 4).

The selection of low-side sensing mode and high-side sensing mode is governed by a hysteresis control to avoid "chattering" of or rapid switching back and forth between the two sensing modes. Thus, referring to FIG. 4, when the high-side sensing mode is selected, the switching regulator does not switch to the low-side sensing mode until the duty cycle falls below a low threshold level $D_L$. On the other hand, when the low-side sensing mode is selected, the switching regulator will remain at low-side sensing until the duty cycle increases above an upper threshold level $D_H$, where $D_H$ is larger than $D_L$ and the difference between levels $D_L$ and $D_H$ includes sufficient margin to avoid chattering of the sensing modes. In this manner, stable transition between the sensing modes is ensured and the switching regulator does not response to transient changes in the duty cycle in operation. In one embodiment, the transition between high-side sensing and low-side sensing is synchronized to the system clock.

In one embodiment, the lower threshold is set at ⅓ (or 33.3%) while the upper threshold is set at ⅔ (or 66.7%). Thus, when the duty cycle of the switching regulator increases from zero, the switching regulator will first be in the low-side sensing mode until the duty cycle exceeds ⅔. At that point, the switching regulator selects high-side sensing mode. When the duty cycle decreases, the high-side sensing mode is selected until the duty cycle drops below ⅓ at which point the switching regulator switches to low-side sensing mode.

In one embodiment, current sensing is provided at the high-side switch and the low-side switch of a current mode switching regulator. In another embodiment, current sensing is provided at the energy storage element, such as the inductor. Thus, current sensing is providing for measuring an increasing inductor current or a decreasing inductor current. It is well understood that an increasing inductor current is associated with the high-side switch being turned on while a decreasing inductor current is associated with the low-side switch being turned on. The current sensing scheme of the present invention is also referred to as a dual-sensing scheme because sensing of both the high-side current and the low-side current is provided. This is in contrast to the single-sensing scheme used in conventional switching regulators where current sensing is only performed at one of the switches.

Figure 5:
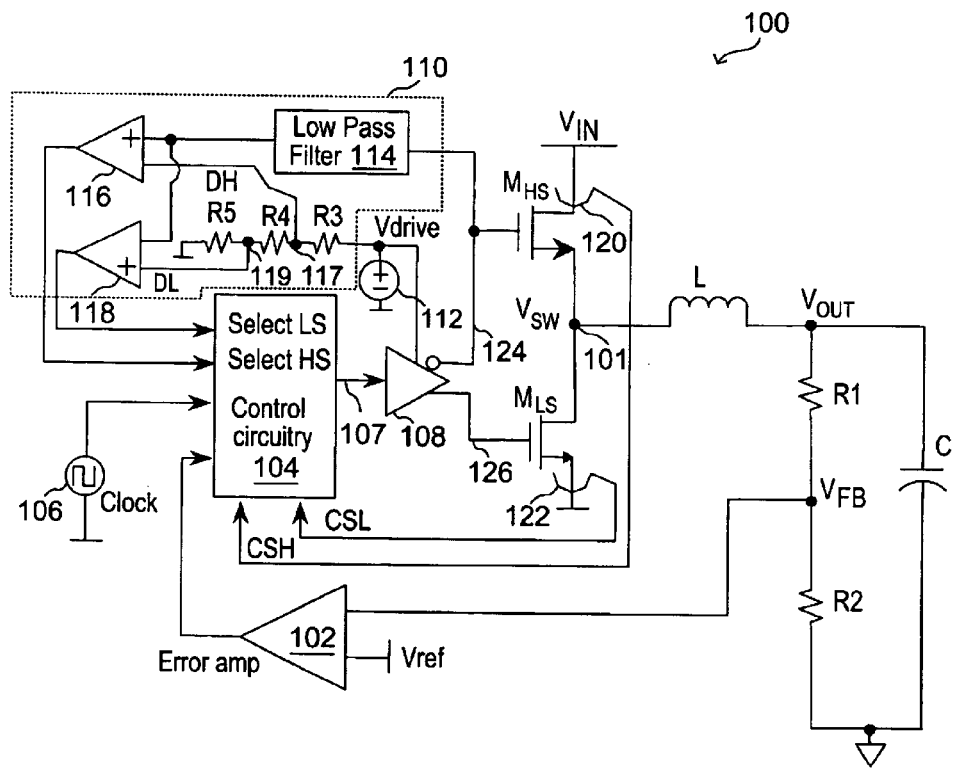
FIG. 5 is a circuit diagram of a current mode switching regulator in a buck topology implementing the current sensing scheme according to one embodiment of the present invention.

FIG. 5 is a circuit diagram of a current mode switching regulator in a buck topology implementing the current sensing scheme according to one embodiment of the present invention. Referring to FIG. 5, current mode switching regulator 100 includes a duty cycle detection circuit 110 and a control circuit 104 for implementing the dual-sensing scheme of the present invention. Switching regulator 100 also includes other conventional circuit components, such as output switching devices, a driver circuit and control circuitry. Thus, FIG. 5 also illustrates how the current sensing scheme can be incorporated in any switching regulator topology.

In FIG. 5, switching regulator 100 includes a high-side switch $M_{HS}$ and a low-side switch $M_{LS}$, both formed as NMOS transistors. The high-side switch and the low-side switch are turned-on alternately to drive switch output node 101 and generate a switch output voltage $V_{SW}$. The switch output voltage $V_{SW}$ drives an output filter circuit including an inductor L and a capacitor C. The switching of voltage $V_{SW}$ causes the current at the inductor L to increase and decrease. When the changing inductor current is coupled to capacitor C, an output voltage $V_{OUT}$ having substantially constant magnitude is created. Current mode control in switching regulator 100 is provided by coupling output voltage $V_{OUT}$ to a voltage divider including resistors R1 and R2. The divided down voltage $V_{FB}$ is fed back to the switching regulator to establish the voltage control loop. Specifically, voltage $V_{FB}$ is coupled to an error amplifier 102 which compares the voltage $V_{FB}$ and a reference voltage $V_{Ref}$. Error amplifier 102 generates an error voltage being the difference between the feedback voltage and the reference voltage. The error voltage is coupled to control circuit 104 for establishing a voltage level for the PWM comparator which in turn generates a Gate_Drive control signal for controlling the high-side and low-side switches to achieve the desired regulation.

In switching regulator 100, the current control loop is established by sensing both the high-side current and the low-side current. Thus, switching regulator 100 includes a first current sensing circuit 120 coupled to the source terminal of high-side switch $M_{HS}$ and a second current sensing circuit 122 coupled to the source terminal of low-side switch $M_{LS}$. Current sensing circuit 120 generates a high-side current sense signal CSH and current sensing circuit 122 generates a low-side current sense signal CSL both signals being coupled to control circuit 104. In accordance with the present invention, control circuit 104 selects which current sense signal to use in the control operation based on the duty cycle of the switch output voltage $V_{SW}$.

Besides receiving the error voltage and the current sense signals as input, control circuit 104 also receives a clock signal from a clock generator 106 for establishing the system clock for the switching regulator. Furthermore, control circuit 104 receives a high-side select signal and a low-side select signal from duty cycle detection circuit 110. Based on the values of the high-side and low-side select signals, control circuit 104 selects one of the two current sense signals for use in the current loop control operation of the switching regulator. In one embodiment, control circuit 104 includes a multiplexer for selecting one of the two current sense signals CSH and CSL based on the high-side and low-side select signals.

Control circuit 104 further includes a PWM comparator and generates a Gate_Drive control signal on output terminal 107. The Gate_Drive signal is coupled to a driver circuit 108 for buffering and signal inversion. In the present embodiment, because the high-side switch and the low-side switch are both of the same polarity, driver circuit 108 provides an inverted Gate_Drive signal to high-side switch $M_{HS}$ as the high-side switch control signal and provides a non-inverted Gate_Drive signal to low-side switch $M_{LS}$ as the low-side switch control signal. In other embodiments, when the high-side switch and the low-side switch are of opposite polarities, the switch control signals can have the same polarities. Furthermore, in the present embodiment, driver circuit 108 is powered by a Vdrive voltage from a voltage source 112. Thus, the switch control signals generated by the driver circuit have a maximum voltage magnitude of the Vdrive voltage and a minimum voltage magnitude of zero voltage.

In operation, control circuit 104 generate the Gate_Drive signal based on the error voltage from error amplifier 102 and based on one of the current sense signals from the current sensing circuits 120 and 122. Control circuit 104 sets the duty cycle of the Gate_Drive signal and thereby sets the duty cycle of the switching devices. When the duty cycle is high, high-side switch $M_{HS}$ is turned on longer to increase the current in inductor L. When the duty cycle is low, high-side switch $M_{HS}$ is turned on for only a short time and low-side switch $M_{LS}$ is turned on longer to decrease the inductor current.

Duty cycle detection circuit 110 receives the Gate_Drive signal as input and operates to generate the high-side and low-side select signals. Specifically, the high-side select signal is asserted when circuit 110 detects a high duty cycle while the low-side select signal is asserted when circuit 100 detects a low duty cycle. In the present embodiment, the high-side select signal is asserted when the duty cycle is greater than ⅔ and the low-side select signal is asserted when the duty cycle is less than ⅓. In the present embodiment, duty cycle detection circuit 110 receives the high side switch control signal as input. Since the high side switch control signal is used to drive high-side switch $M_{HS}$, a logical "hi" value of the high side switch control signal turns on the high-side switch and can therefore be used as an indication of the duty cycle of the switch output voltage $V_{SW}$.

In duty cycle detection circuit 110, the high side switch control signal is coupled to a low pass filter to remove high frequency transients and to average out the voltage levels of the switch control signal waveform. Essentially, the filtered duty cycle signal on terminal 115 is indicative of the average voltage magnitude of the high side switch control signal. Thus, if the duty cycle is greater than ⅔, the filtered signal will have a voltage magnitude greater than ⅔ of the maximum voltage (the Vdrive voltage). If the duty cycle is less than ⅓, then the filtered signal will have a voltage magnitude less than ⅓ of the maximum voltage (the Vdrive voltage).

The filtered duty cycle signal is coupled to a first comparator 116 and a second comparator 118. Comparator 116 compares the filtered duty cycle signal with a high duty cycle threshold level $D_H$. In comparator 116, the filtered duty cycle signal is coupled to the positive input terminal while the high duty cycle threshold level $D_H$ is coupled to the negative input terminal. Thus, when the filtered duty cycle is greater than the high duty cycle threshold level $D_H$, comparator 116 asserts its output signal—the high-side select signal.

On the other hand, comparator 118 compares the filtered duty cycle signal with a low duty cycle threshold level $D_L$. In comparator 118, the filtered duty cycle signal is coupled to the negative input terminal while the low duty cycle threshold level $D_L$ is coupled to the positive input terminal. Thus, when the filtered duty cycle is less than the low duty cycle threshold level $D_L$, comparator 118 asserts its output signal—the low-side select signal.

In the present embodiment, the high duty cycle threshold level $D_H$ and the low duty cycle threshold level $D_L$ are established using a resistor divider including resistors R3, R4 and R5, all of equal resistance. The resistor divider is connected between voltage Vdrive and the ground potential. Thus, the divided down voltages generated by the resistor divider is proportional to the magnitude of the switch control signals generated by driver circuit 108. The divided down voltages can thus be effectively used to determine the duty cycle of the switch control signals. In the present embodiment, the high duty cycle threshold level $D_H$ is generated at a node 117 between resistors R3 and R4. Thus, the high duty cycle threshold level $D_H$ represents ⅔ of the Vdrive voltage. The low duty cycle threshold level $D_L$ is generated at a node 119 between resistors R4 and R5. Thus, the low duty cycle threshold level $D_L$ represents ⅓ of the Vdrive voltage. In other embodiments, different duty cycle threshold levels can be established by using different resistance values for resistors R3, R4 and R5. However, the duty level threshold levels should be spaced apart sufficient to implement an effective hysteresis operation.

In summary, in duty cycle detection circuit 110, the high-side switch control signal is low-pass filtered to generate a filtered duty cycle signal being the average voltage value of the high-side switch control signal. The filtered duty cycle signal is coupled to first comparator 116 and second comparator 118 for determining the state of the duty cycle. When the filtered duty cycle signal has a voltage value greater than ⅔ of the Vdrive voltage, the high-side select signal will be asserted. When the filtered duty cycle signal has a voltage value less than ⅓ of the Vdrive voltage, the low-side select signal will be asserted.

Figure 6A:
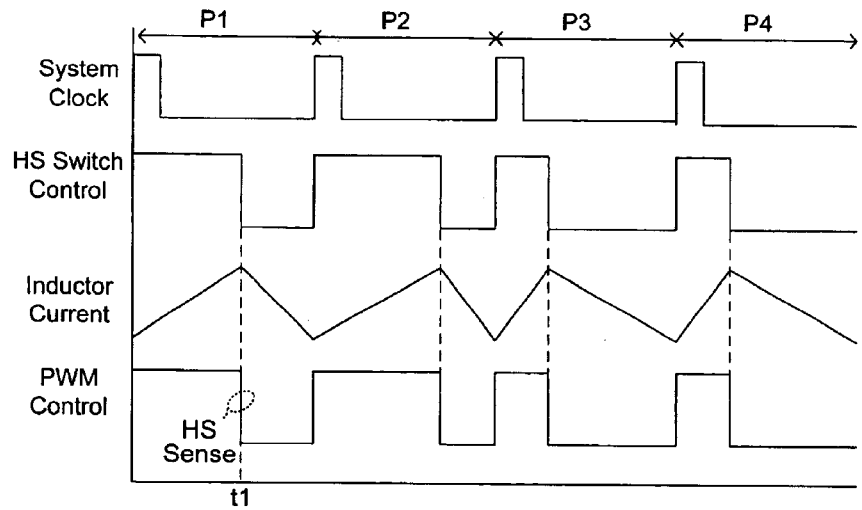
FIG. 6A illustrates the regulator operation of the switching regulator of FIG. 5 when high-side sensing is selected.
Figure 6B:
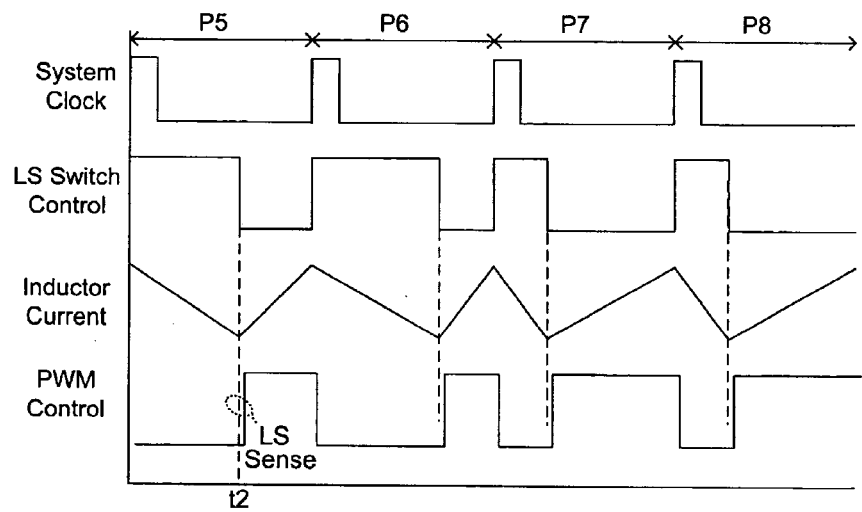
FIG. 6B illustrates the regulator operation of the switching regulator of FIG. 5 when low-side sensing is selected.

The operation of switching regulator 100 implementing the dual-sensing scheme of the present invention is as follows. FIG. 6A illustrates the regulator operation when high-side sensing is selected while FIG. 6B illustrates the regulator operation when low-side sensing is selected.

The operation of switching regulator 100 is triggered by the system clock. At the beginning of each clock cycle, control circuit 104 examines the status of the high-side select signal and the low-side select signal to determine whether high-side sensing or low-side sensing has been selected. When high-side sensing has been selected (FIG. 6A), the high-side switch control signal is asserted on the rising edge of the system clock. As a result, high-side switch $M_{HS}$ is turned on and switch output voltage $V_{SW}$ is forced to the $V_{IN}$ voltage, thereby causing the inductor current to increase. The output voltage $V_{OUT}$ is fed back to error amplifier 102 for generating the error voltage for control circuit 104. Meanwhile, the high-side current is being sensed by sensing circuit 120 and the high-side current sense signal CSH is also provided to control circuit 104. Based on the error voltage and the current sense signal CSH, control circuit 104 provides current mode control for the switching regulator. Specifically, when the inductor rises to the level set by the error voltage, the PWM comparator in control circuit 104 triggers its output signal (as indicated in FIG. 6A at time t1). The PWM comparator trigger causes the high-side switch control signal to be deasserted and the low-side switch control signal to be asserted. As a result, the inductor current decreases. The switching regulator remains in this state until the next system clock system.

When high-side sensing is selected, the duty cycle is high and therefore a sufficiently large sensing window is provided at the high-side switch for current sensing. During the high-side sensing operation, the duty cycle is continuously being monitored by duty cycle detection circuit 110. Duty cycle detector circuit 110 continues to assert the high-side select signal until the duty cycle has fallen below the preselected threshold which is ⅓ in the present embodiment. In the illustration in FIG. 6A, it is assumed that switching regulator has a duty cycle of greater than ⅔ and is therefore in high-side sensing mode during the first and second clock periods (P1 and P2). However, it is further assumed that at the third and fourth clock periods (P3 and P4), the duty cycle of switching regulator 100 drops to less than ⅓. As can be seen in FIG. 6A, when the duty cycle is low, the high-side switch is on for only a short time as indicated by the state of the high-side switch control signal. The current sensing window for the high-side switch current becomes very short, making effective measurement very difficult.

However, in accordance with the present invention, when duty cycle detector circuit 110 detects that the duty cycle of the switching regulator has dropped to below ⅓, such as by monitoring the high-side switch control signal, the duty cycle detection circuit asserts the low-side select signal and deassert the high-side select signal. In this manner, switching regulator 100 switches to low-side current sensing at low duty cycle. When the duty cycle is low, the sensing window for the low-side switch current is longer, allowing effective current measurements to be made.

Specifically, the transition between high-side and low-side sensing occurs at the start of the system clock. Thus, after the low-side select signal is asserted, at the next system clock (FIG. 6B), the low-side switch control signal is asserted and low-side switch $M_{LS}$ is turned on and switch output voltage $V_{SW}$ is forced to the $V_{SS}$ or ground voltage, thereby causing the inductor current to decrease. The output voltage $V_{OUT}$ is fed back to error amplifier 102 for generating the error voltage for control circuit 104. Meanwhile, the low-side current is being sensed by sensing circuit 122 and the low-side current sense signal CSL is also provided to control circuit 104. Based on the error voltage and the current sense signal CSL, control circuit 104 provides current mode control for the switching regulator. Specifically, when the inductor falls to the level set by the error voltage, the PWM comparator in control circuit 104 triggers its output signal (as indicated in FIG. 6B at time t2). The PWM comparator trigger causes the low-side switch control signal to be deasserted and the high-side switch control signal to be asserted. As a result, the inductor current increases. The switching regulator remains in this state until the next system clock system.

As described above, switching regulator 100 transitions between high-side sensing to low-side sensing when the duty cycle drops to the preselected level. Thus, a large sensing window for the low-side switch current is provided for effective current measurement. The operation of switching regulator 100 remains in the low-side sensing mode (system clock periods P5 and P6) until the duty cycle increases above the preselected level which is ⅔ in the present embodiment. In FIG. 6B, at clock periods P7 and P8, the duty cycle has increased so that the on-time for low-side switch $M_{LS}$ becomes very small, reducing the sensing window for the low-side switch current. Duty cycle detection circuit 110 will accordingly assert the high-side select signal and deassert the low-side select signal so that switching regulator transitions to high-side sensing at the next system clock.

By selectively engaging either high-side sensing or low-side sensing based on the duty cycle, the switching regulator of the present invention is ensured to have a long sensing window for current sensing no matter what the duty cycle is. The switching regulator of the present invention can provide effective current mode control over a wide range of duty cycle variations, including duty cycle variations between 0 to 100 percent. Furthermore, based on the selected current sensing mode, the switching regulator practices peak or valley control thereby providing improved current mode control performance.

Figure 7:
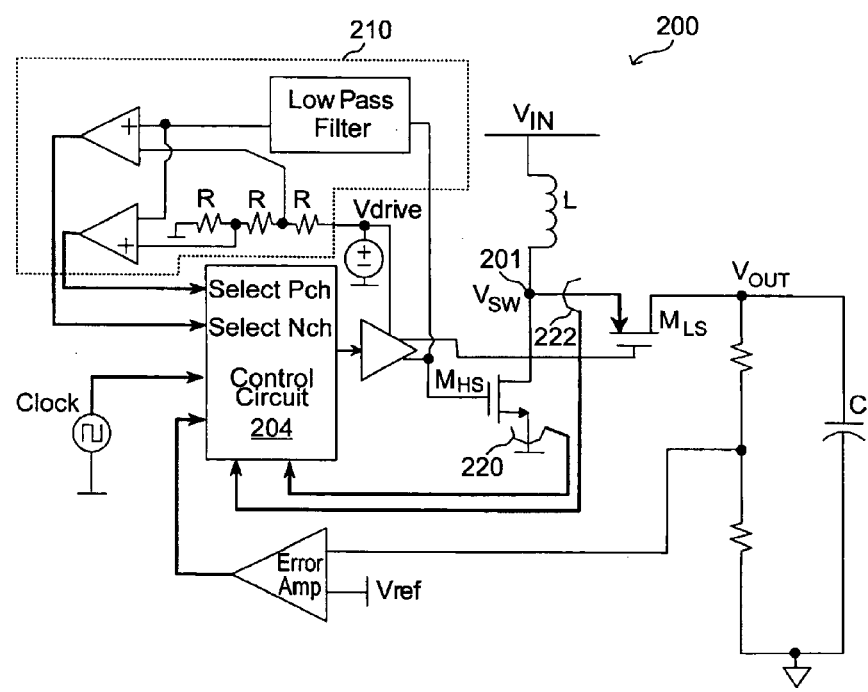
FIG. 7 is a circuit diagram of a current mode switching regulator in a boost topology implementing the current sensing scheme according to one embodiment of the present invention.

FIG. 5 illustrates the incorporation of the current sensing scheme of the present invention in a current mode switching regulator in a buck topology. The current sensing scheme of the present invention is applicable to other switching regulator topologies as well, such as the boost topology or the buck-boost topology. FIG. 7 is a circuit diagram of a current mode switching regulator in a boost topology implementing the current sensing scheme according to one embodiment of the present invention.

Referring to FIG. 7, switching regulator 200 includes an NMOS transistor as the high-side switch and a PMOS transistor as the low-side switch. Specifically, in the boost topology, the inductor is coupled between the input voltage $V_{IN}$ and the switch output node 201. The NMOS transitory is coupled between the switch output node 201 and the ground node. When the NMOS transistor is turned on, the inductor current increases. On the other hand, the PMOS transistor is coupled between the switch output node 201 and the capacitor C for generating the output voltage $V_{OUT}$. Thus, when the PMOS transistor is turned on, the inductor current decreases. Thus, in the boost topology, duty cycle is defined as the percentage of each system clock cycle that the NMOS transistor (the high-side switch) is on.

To implement the current sensing scheme of the present invention in switching regulator 200, a first current sensing circuit 220 is provided to sense the current at the NMOS transistor and a second current sensing circuit 222 is provided to sense the current at the PMOS transistor. A duty cycle detection circuit 210 is coupled to monitor the NMOS switch control signal as the NMOS switch control signal determines the duty cycle. Duty cycle detection circuit 210 generates a NMOS select signal and a PMOS select signal whereby depending on the duty cycle, only one of the select signals will be asserted. A control circuit 204 is coupled to receive the error voltage from the feedback voltage, the current sense signal and the select signals. The control circuit 204 operates to select high-side sensing at the NMOS transistor when the duty cycle is high and to select low-side sensing at the PMOS transistor when the duty cycle is low.

Figure 8:
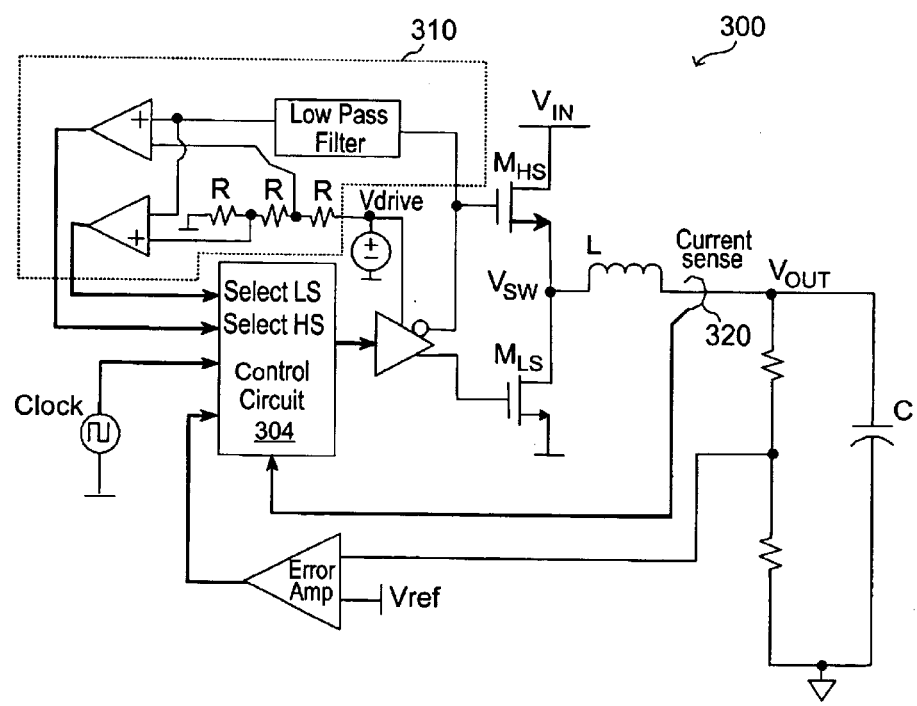
FIG. 8 is a circuit diagram of a current mode switching regulator in a buck topology implementing the current sensing scheme according to another embodiment of the present invention.

The current sensing scheme of the present invention can also be applied to a switching regulator implementing current sensing at the inductor. FIG. 8 is a circuit diagram of a current mode switching regulator in a buck topology implementing the current sensing scheme according to another embodiment of the present invention. In the configuration shown in FIG. 8, the current sensing scheme of the present invention is applied to provide peak and valley control.

Specifically, switching regulator 300 of FIG. 8 includes a current sensing circuit 320 at the output terminal (voltage $V_{OUT}$) of the inductor L. When the duty cycle is at the extremes, the current sensing window for either the low-side or the high-side current can be very short as the phase for the respective current can be very short. In accordance with the present invention, a duty cycle detection circuit 310 is incorporated in switching regulator 300 to monitor the high-side switch control signal which is indicative of the duty cycle. When a high duty cycle is detected (that is, the duty cycle is above a preselected threshold), duty cycle detection circuit asserts the high-side select signal to cause control circuit 304 to apply valley control to regulate the output voltage $V_{OUT}$. When the duty cycle drops to below the predefined threshold, duty cycle detection circuit 310 asserts the low-side select signal which causes control circuit 304 to apply peak control to regulate the output voltage $V_{OUT}$. In this manner, current sensing is always performed at the phase of the inductor current with the longer sensing window.

In the above descriptions and shown in FIGS. 5, 7 and 8, the duty cycle detection circuit of the present invention is illustrated as including a low pass filter and a pair of comparators for generating the select signals. Furthermore, a resistor divider is used to establish the comparator threshold levels for implementing hysteresis control. The circuit configuration of the duty cycle detection circuit in the above descriptions is illustrative only and is not intended to be limiting. One of ordinary skill in the art, upon being apprised of the present invention, would appreciate that the duty cycle detection circuit can assume other circuit configuration for monitoring the duty cycle and generating select signals for the control circuit. The exact configuration of the duty cycle detection circuit is not critical to the implementation of the current sensing scheme of the present invention. For example, the duty cycle could be computed by comparing the on-times of the gate drive signals of high-side switch $M_{HS}$ and low-side switch $M_{LS}$. Also, the threshold levels for the hysteresis control can be implemented by other means.

The dual-sensing scheme of the present invention provides many advantages. First, the dual-sensing scheme enables effective current sensing for duty cycle that varies between 0 to 100 percent. Therefore, a switching regulator implementing the dual-sensing scheme can have improved current mode control regardless of the duty cycle variations. The switching regulator implementing the dual-sensing scheme of the present invention can have wide application and its performance is not degraded due to large variations in duty cycle such as that caused by changing load conditions or changing input voltage values. Second, because current sensing is performed at the power switch or at the inductor current phase with the longer sense window, a fast PWM comparator is not needed and the design burden of the switching regulator is reduced. Furthermore, current sensing can be performed at each system clock cycle, eliminating noise problems that are associated with sensing techniques that involve skipping clock cycles.

In the above descriptions, the current sensing scheme of the present invention is described as being applied to inductor-based switching regulators. In other embodiments, the dual current sensing scheme of the present invention can also be applied to a transformer-based switching regulator, also known as isolated switching regulators. Transformer-based switching regulators suffer the same constraints as inductor-based systems in that at extremes of duty cycle, the current sensing window can be very short. Therefore, the dual sensing scheme of the present invention can be advantageously applied to improve the current sensing capability and the current mode control performance of transformer-based switching regulators.

The above detailed descriptions are provided to illustrate specific embodiments of the present invention and are not intended to be limiting. Numerous modifications and variations within the scope of the present invention are possible. The present invention is defined by the appended claims.

I claim:

1. A current mode switching regulator including a first switch and a second switch coupled to drive a switch output node for generating a switch output voltage which switch output voltage is used to generate a regulated output voltage having a substantially constant magnitude, the switching regulator comprising:
   a first current sensing circuit for sensing a current through the first switch and providing a first current sense signal;
   a second current sensing circuit for sensing a current through the second switch and providing a second current sense signal;
   a control circuit for generating a first switch control signal and a second switch control signal for driving the first switch and the second switch respectively for generating the switch output voltage so as to maintain the regulated output voltage at a substantially constant magnitude, the control circuit generating the switch control signals in response to a selected one of the first and second current sense signals; and
   a duty cycle detection circuit coupled to determine a duty cycle of the switching regulator, the duty cycle detection circuit asserting a first select signal when the duty cycle exceeds a first threshold level and asserting a second select signal when the duty cycle is less than a second threshold level, the first threshold level being greater than the second threshold level;
   wherein the control circuit selects the first current sense signal when the first select signal is asserted and the control circuit selects the second current sense signal when the second select signal is asserted.

2. The switching regulator of claim 1, further comprising:
   an output filter circuit coupled to the switch output node for receiving the switch output voltage and generating the regulated output voltage,
   wherein the first switch is turned on to cause a current into the output filter circuit to increase while the second switch is turned on to cause the current into the output filter circuit to decrease.

3. The switching regulator of claim 2, wherein the duty cycle is indicative of the amount of time within a clock period the first switch is turned on.

4. The switching regulator of claim 3, wherein the duty cycle detection circuit determines the duty cycle of the switching regulator by monitoring the first switch control signal.

5. The switching regulator of claim 4, wherein the duty cycle detection circuit comprises:
   a low pass filter coupled to receive the first switch control signal and providing a filtered signal;
   a first comparator receiving the filtered signal and the first threshold level, the first comparator generating the first select signal; and
   a second comparator receiving the filtered signal and the second threshold level, the second comparator generating the second select signal.

6. The switching regulator of claim 5, wherein the first switch control signal is generated by a driver circuit coupled to the control circuit, the driver circuit being powered by a drive supply voltage, and the duty cycle detection circuit further comprises a resistor divider network coupled between the drive supply voltage and a ground voltage, the resistor divider network dividing the drive supply voltages and providing the first threshold level and the second threshold level.

7. The switching regulator of claim 6, wherein the resistor divider network comprises a first resistor, a second resistor and a third resistor connected in series between the drive supply voltage and the ground voltage, the first, second and third resistors having equal resistance, the first threshold level being provided between the first and second resistors and the second threshold level being provided between the second and third resistors.

8. A current mode switching regulator, comprising:
   a first switch and a second switch connected in series between a first voltage and a second voltage, a switch output node between the first switch and the second switch providing a switch output voltage for use in generating a regulated output voltage;
   a first current sensing circuit for sensing a current through the first switch and providing a first current sense signal;
   a second current sensing circuit for sensing a current through the second switch and providing a second current sense signal;
   a control circuit receiving an error voltage, the first and second current sense signals and a system clock as input signals, the control circuit generating a control signal in response to the error voltage and a selected one of the current sense signals, wherein the error voltage is indicative of the difference between a voltage corresponding to the regulated output voltage and a reference voltage;
   a driver circuit coupled to the control circuit for receiving the control signal, the driver circuit generating a first switch control signal and a second switch control signal for driving the first switch and the second switch respectively in response to the control signal; and
   a duty cycle detection circuit coupled to determine a duty cycle of the switching regulator, the duty cycle detection circuit asserting a first select signal when the duty cycle exceeds a first threshold level and asserting a second select signal when the duty cycle is less than a second threshold level, the first threshold level being greater than the second threshold level;
   wherein the control circuit selects the first current sense signal when the first select signal is asserted and the control circuit selects the second current sense signal when the second select signal is asserted.

9. The switching regulator of claim 8, further comprising an error amplifier having a first input node coupled to receive the voltage corresponding to the regulated output voltage, a second input terminal coupled to a reference voltage, and an output node providing the error voltage indicative of the difference between the feedback voltage and the reference voltage.

10. The switching regulator of claim 9 wherein the voltage corresponding to the regulated output voltage comprises a divided-down voltage of the regulated output voltage.

11. The switching regulator of claim 8, further comprising:
  an output filter circuit coupled to the switch output node for receiving the switch output voltage and generating the regulated output voltage.

12. The switching regulator of claim 11, wherein the output filter circuit comprises an inductor coupled between the switch output node and an output terminal and a capacitor coupled between the output terminal and the second voltage, the regulated output voltage being provided at the output terminal; and wherein the current in the inductor increases when the first switch is turned on and the current in the inductor decreases when the second switch is turned on.

13. The switching regulator of claim 8, wherein the duty cycle detection circuit determines the duty cycle of the switching regulator by monitoring the first switch control signal.

14. The switching regulator of claim 13, wherein the duty cycle detection circuit comprises:
  a low pass filter coupled to receive the first switch control signal and providing a filtered signal;
  a first comparator receiving the filtered signal and the first threshold level, the first comparator generating the first select signal; and
  a second comparator receiving the filtered signal and the second threshold level, the second comparator generating the second select signal.

15. The switching regulator of claim 14, wherein the driver circuit is powered by a drive supply voltage, and the duty cycle detection circuit further comprises a resistor divider network coupled between the drive supply voltage and a ground voltage, the resistor divider network dividing the drive supply voltages and providing the first threshold level and the second threshold level.

16. The switching regulator of claim 15, wherein the resistor divider network comprises a first resistor, a second resistor and a third resistor connected in series between the drive supply voltage and the ground voltage, the first, second and third resistors having equal resistance, the first threshold level being provided between the first and second resistors and the second threshold level being provided between the second and third resistors.

17. The switching regulator of claim 8, wherein the first voltage comprises an input voltage of the switching regulator and the second voltage comprises a ground voltage.

18. A current mode switching regulator, comprising:
  a first switch and a second switch connected in series between an output terminal and a second voltage, a switch output node between the first switch and the second switch providing a switch output voltage for generating a regulated output voltage at the output terminal;
  a filter circuit including an inductor coupled between a first voltage and the switch output node and a capacitor coupled between the output terminal and the second voltage;
  a first current sensing circuit for sensing a current through the first switch and providing a first current sense signal;
  a second current sensing circuit for sensing a current through the second switch and providing a second current sense signal;
  a control circuit receiving an error voltage, the first and second current sense signals and a system clock as input signals, the control circuit generating a control signal in response to the error voltage and a selected one of the current sense signals, wherein the error voltage is indicative of the difference between a voltage corresponding to the regulated output voltage and a reference voltage;
  a driver circuit coupled to the control circuit for receiving the control signal, the driver circuit generating a first switch control signal and a second switch control signal for driving the first switch and the second switch respectively in response to the control signal; and
  a duty cycle detection circuit coupled to determine a duty cycle of the switching regulator, the duty cycle detection circuit asserting a first select signal when the duty cycle exceeds a first threshold level and asserting a second select signal when the duty cycle is less than a second threshold level, the first threshold level being greater than the second threshold level;
  wherein the control circuit selects the second current sense signal when the first select signal is asserted and the control circuit selects the first current sense signal when the second select signal is asserted.

19. The switching regulator of claim 18, further comprising
  an error amplifier having a first input node coupled to receive the voltage corresponding to the regulated output voltage, a second input terminal coupled to a reference voltage, and an output node providing the error voltage indicative of the difference between the feedback voltage and the reference voltage.

20. The switching regulator of claim 19 wherein the voltage corresponding to the regulated output voltage comprises a divided-down voltage of the regulated output voltage.

21. The switching regulator of claim 18, wherein the current in the inductor increases when the second switch is turned on and the current in the inductor decreases when the first switch is turned on.

22. The switching regulator of claim 18, wherein the duty cycle detection circuit determines the duty cycle of the switching regulator by monitoring the first switch control signal.

23. The switching regulator of claim 22, wherein the duty cycle detection circuit comprises:
  a low pass filter coupled to receive the first switch control signal and providing a filtered signal;
  a first comparator receiving the filtered signal and the first threshold level, the first comparator generating the first select signal; and
  a second comparator receiving the filtered signal and the second threshold level, the second comparator generating the second select signal.

24. The switching regulator of claim 14, wherein the driver circuit is powered by a drive supply voltage, and the duty cycle detection circuit further comprises a resistor divider network coupled between the drive supply voltage and a ground voltage, the resistor divider network dividing the drive supply voltages and providing the first threshold level and the second threshold level.

25. A current mode switching regulator including a first switch and a second switch coupled to drive a switch output node for generating a switch output voltage and a filter circuit coupled to the switch output node for generating a regulated output voltage having a substantially constant magnitude, the switching regulator comprising:
  a current sensing circuit for sensing a current through the filter circuit and providing a current sense signal, the current being sensed at a first phase where the current is increasing or a second phase where the current is decreasing;

a control circuit for generating a first switch control signal and a second switch control signal for driving the first switch and the second switch respectively for generating the switch output voltage so as to maintain the regulated output voltage at a substantially constant magnitude, the control circuit generating the switch control signals in response to the current sense signal; and a duty cycle detection circuit coupled to determine a duty cycle of the switching regulator, the duty cycle detection circuit asserting a first select signal when the duty cycle exceeds a first threshold level and asserting a second select signal when the duty cycle is less than a second threshold level, the first threshold level being greater than the second threshold level;

wherein the control circuit selects the current sense signal being measured during the first phase when the first select signal is asserted and the control circuit selects the current sense signal being measured during the second phase when the second select signal is asserted.

26. The switching regulator of claim 25, wherein the first switch is turned on to cause the current into the output filter circuit to increase while the second switch is turned on to cause the current into the output filter circuit to decrease.

27. The switching regulator of claim 26, wherein the duty cycle is indicative of the amount of time within a clock period the first switch is turned on.

28. The switching regulator of claim 27, wherein the duty cycle detection circuit determines the duty cycle of the switching regulator by monitoring the first switch control signal.

29. The switching regulator of claim 28, wherein the duty cycle detection circuit comprises:

a low pass filter coupled to receive the first switch control signal and providing a filtered signal;

a first comparator receiving the filtered signal and the first threshold level, the first comparator generating the first select signal; and a second comparator receiving the filtered signal and the second threshold level, the second comparator generating the second select signal.

30. The switching regulator of claim 29, wherein the first switch control signal is generated by a driver circuit coupled to the control circuit, the driver circuit being powered by a drive supply voltage, and the duty cycle detection circuit further comprises a resistor divider network coupled between the drive supply voltage and a ground voltage, the resistor divider network dividing the drive supply voltages and providing the first threshold level and the second threshold level.

31. The switching regulator of claim 30, wherein the resistor divider network comprises a first resistor, a second resistor and a third resistor connected in series between the drive supply voltage and the ground voltage, the first, second and third resistors having equal resistance, the first threshold level being provided between the first and second resistors and the second threshold level being provided between the second and third resistors.

32. A method in a current mode switching regulator, the switching regulator including a first switch and a second switch coupled to drive a switch output node for generating a switch output voltage which switch output voltage is used to generate a regulated output voltage having a substantially constant magnitude, comprising:

sensing a current through the first switch and providing a first current sense signal;

sensing a current though the second switch and providing a second current sense signal;

generating a first switch control signal and a second switch control signal for driving the first switch and the second switch respectively to generate the switch output voltage so as to maintain the regulated output voltage at a substantially constant magnitude, the first switch control signal and the second control signal being generated in response to an error voltage and a selected one of the first and second current sense signals, the error voltage being indicative of the difference between a voltage corresponding to the regulated output voltage and a reference voltage, monitoring a duty cycle of the switching regulator;

comparing the duty cycle to a first threshold level and a second threshold level, the first threshold level being greater than the second threshold level;

asserting a first select signal when the duty cycle exceeds the first threshold level; and asserting a second select signal when the duty cycle is less than the second threshold level, wherein the first select signal is asserted to select the first current sense signal and the second select signal is asserted to select the second current sense signal.

33. The method of claim 32, wherein the switching regulator further includes an output filter circuit coupled to the switch output node for receiving the switch output voltage and generating the regulated output voltage and wherein the first switch is turned on to cause a current into the output filter circuit to increase while the second switch is turned on to cause the current into the output filter circuit to decrease.

34. The method of claim 33, wherein the duty cycle is indicative of the amount of time within a clock period the first switch is turned on.

35. The method of claim 34, wherein monitoring a duty cycle of the switching regulator comprises monitoring the first switch control signal.

36. The method of claim 35, wherein monitoring a duty cycle of the switching regulator comprises:

low-pass filtering the first switch control signal;

comparing the filtered signal to the first threshold level;

generating a first select signal when the filtered signal is greater than the first threshold level;

comparing the filtered signal to the second threshold level; and generating a second select signal when the filtered signal is less than the second threshold level.

* * * * *